US011892552B2

United States Patent
Qiao et al.

(10) Patent No.: US 11,892,552 B2
(45) Date of Patent: Feb. 6, 2024

(54) DATA INTERACTION METHOD, DEVICE, SYSTEM, AND MOBILE TERMINAL (71) Applicant: BEIJING XIAOMI MOBILE SOFTWARE CO., LTD., Beijing (CN)

(72) Inventors: Guangjun Qiao, Beijing (CN); Kai Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 141 days.

(21) Appl. No.: 17/566,576

(22) Filed: Dec. 30, 2021

(65) Prior Publication Data

US 2022/0413084 A1 Dec. 29, 2022

(30) Foreign Application Priority Data

Jun. 25, 2021 (CN) .......................... 202110711394.1

(51) Int. Cl.
*G01S 5/02* (2010.01)
*H04W 72/51* (2023.01)
*H04W 72/30* (2023.01)
*H04W 64/00* (2009.01)

(52) U.S. Cl.
CPC ......... *G01S 5/0284* (2013.01); *H04W 64/003* (2013.01); *H04W 72/30* (2023.01); *H04W 72/51* (2023.01)

(58) Field of Classification Search
None
See application file for complete search history.

(56) References Cited

U.S. PATENT DOCUMENTS

2019/0098499 A1* 3/2019 Lerch .................... H04W 76/10

FOREIGN PATENT DOCUMENTS

| CN | 110363529 A | * | 10/2019 |
| CN | 110363529 A1 | | 10/2019 |

OTHER PUBLICATIONS

Extended European Search Report issued in Application No. 21217958. 4, dated Jun. 1, 2022,(10p).
NXP Accelerates UWB-based Mobile Payment Innovation with NTT DOCOMO and Sony, (4p).

* cited by examiner

*Primary Examiner* — Adolf Dsouza
(74) *Attorney, Agent, or Firm* — Arch & Lake LLP (57) ABSTRACT

A data interaction method includes: acquiring UWB positioning signals transmitted by at least three UWB positioning base stations, where one of the at least three UWB positioning base stations is a reference positioning base station; and determining a relative position of the mobile terminal with respect to the reference positioning base station based on the UWB positioning signals.

9 Claims, 3 Drawing Sheets acquiring UWB positioning signals transmitted by at least three UWB positioning base stations — 11 determining a relative position of the mobile terminal with respect to the reference positioning base station according to the UWB positioning signals — 12

DATA INTERACTION METHOD, DEVICE, SYSTEM, AND MOBILE TERMINAL

The present application is based on and claims the priority of Chinese patent application number 202110711394.1, filed on Jun. 25, 2021, the entire content of which is hereby incorporated by reference herein for all purposes.

TECHNICAL FIELD

The present disclosure relates to the field of data interaction technology, and in particular to a data interaction method, device, system, mobile terminal and storage medium.

BACKGROUND

At present, a payment system for a transportation device such as rapid transit, trams, and light rails consists of a card reader on the transportation device and a transportation card, mobile QR code or mobile NFC on the passenger's hand. The transportation card is taken as an example. The system generally uses close contact payment to complete the ride payment, requiring the passenger to contact the transportation card with the card reader at close range and wait for the card to be successfully swiped. However, in the related art, when using the transportation card to pay, the user needs to apply for the respective transportation card, and the transportation card is easy to lose. Thus, there may be problems such as the user forgetting to carry the card.

SUMMARY

According to a first aspect of the present disclosure, there is provided a data interaction method applied to a mobile terminal. The method includes: acquiring Ultra-WideBand (UWB) positioning signals transmitted by at least three UWB positioning base stations, where one of the at least three UWB positioning base stations is a reference positioning base station; and determining the relative position of the mobile terminal with respect to the reference positioning base station according to the UWB positioning signals.

According to a second aspect the present disclosure, there is provided a UWB positioning base station. The base station includes: a signal transmitting module, configured to transmit a UWB positioning signal including an identification field, such that a mobile terminal determines that the UWB positioning base station as a preset reference positioning base station according to the identification field.

According to a third aspect of the present disclosure, a data interaction system is provided. The system includes at least three UWB positioning base stations and a mobile terminal. One of the at least three UWB positioning base stations is a reference positioning base station. Each of the UWB positioning base stations is configured to transmit a UWB positioning signal according to a preset period. The mobile terminal is configured to acquire UWB positioning signals transmitted by at least three UWB positioning base stations, and to determine the relative position of the mobile terminal with respect to the reference positioning base station according to the UWB positioning signals.

According to a fourth aspect of the present disclosure, there is provided a mobile terminal, including: a processor; and a memory, configured to store a computer program executable by the processor, where the processor is configured to execute the computer program in the memory, so as to implement the method according to any one of the foregoing embodiments.

According to a fifth aspect of the present disclosure, a computer-readable storage medium is provided. When an executable computer program in the storage medium is executed by a processor, the method as described in any one of the above embodiments is implemented.

It should be understood that the above general description and the following detailed description are merely exemplary and explanatory, and cannot limit the present disclosure.

BRIEF DESCRIPTION OF THE DRAWINGS

The drawings herein are incorporated into the specification and constitute a part of the specification, show embodiments in accordance with the present disclosure, and are used together with the specification to explain the principle of the present disclosure.

DETAILED DESCRIPTION OF THE EMBODIMENTS

Herein, embodiments will be described in detail, and examples thereof are shown in the accompanying drawings. When the following description refers to the drawings, unless otherwise indicated, the same numbers in different drawings indicate the same or similar elements. The embodiments described below do not represent all the embodiments consistent with the present disclosure. On the contrary, they are merely examples of devices consistent with some aspects of the present disclosure as detailed in the appended claims. It should be noted that, in the case of no conflict, the following embodiments and features in the implementations can be combined with each other.

Definitions

Ultra-WideBand (UWB), also known as ultra-wideband, is a wireless carrier communication technology that does not use a sinusoidal carrier, but uses nanosecond non-sine narrow pulses, for the purpose of transmitting data, and thus occupies a very wide spectrum. UWB technology has advantages such as low system complexity, low power spectral density of the transmitted signal, insensitive to channel fading, low interception capability, and high positioning accuracy.

When performing UWB positioning, the mobile terminal receives the UWB positioning signal transmitted by each UWB positioning base station, so as to obtain the movement trajectory of the mobile terminal relative to each UWB positioning base station. The intersection point of multiple movement trajectories indicates the current position of the mobile terminal.

In practical applications, since the location of each UWB positioning base station is known, the relative position (such as distance and offset angle, etc.) of the mobile terminal with respect to each UWB positioning base station can be calculated, once the current position of the mobile terminal is determined.

In order to solve the above technical problems, embodiments of the present disclosure provide a data interaction method, which may be applied to a mobile terminal, such as a smart phone, a smart bracelet, a tablet computer, and any other device; and an application scenario where the user carrying a mobile terminal passes through a gate and requires data interaction, such scenario including, but not limited to, entrance/exit of a station, entrance/exit of a canteen, entrance/exit of an office building, etc. For the ease of description, the technical solutions of embodiments are described below by taking a user carrying a mobile terminal and passing through a gate of a subway station as an example.

Figure 1:
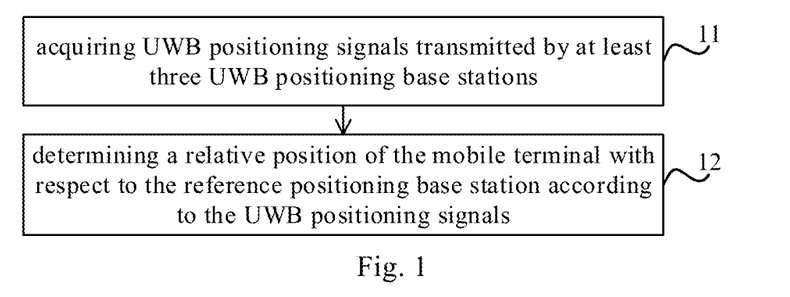
FIG. 1 is a flow chart showing a data interaction method according to an embodiment.

FIG. 1 is a flow chart showing a data interaction method according to an embodiment. Reference is made to FIG. 1, the data interaction method includes steps 11 to 12.

In step 11, UWB positioning signals transmitted by at least three UWB positioning base stations are acquired, where one of the at least three UWB positioning base stations is a reference positioning base station.

In an embodiment, each UWB positioning base station may transmit a UWB positioning signal. There may be several gates at entrance/exit of the station (hereinafter referred to as entrance and exit), and at least three UWB positioning base stations may be installed at different positions at the entrance and exit. The location of each UWB positioning base station can be set according to specific scenarios. For example, each UWB positioning base station is set at the same height, so that the installation plane where each UWB positioning base station is located is parallel to the horizontal plane. The value of the above mentioned height may be from 80 cm to 150 cm, i.e., the height range of the user carrying the mobile terminal. This renders the height of the mobile terminal to be located in or close to the above mentioned installation plane as much as possible, so that there is no need to project onto the above installation plane for calculating the relative distance with respect to the gate, etc. Thus, the amount of data for processing the current position or relative position of the mobile terminal is reduced. It should be understood that as long as the mobile terminal can determine its own position based on at least three UWB positioning base stations, the respective technical solutions shall fall within the protection scope of the present disclosure.

In an embodiment, a UWB receiving module is provided in the mobile terminal, and the UWB receiving module can scan the UWB positioning signal in space according to a set period or in real time. Each UWB positioning signal includes identification information or identification time stamp of the respective UWB positioning base station and other information that can distinguish among the base stations.

In an embodiment, one of the above-mentioned at least three UWB positioning base stations is a reference positioning base station, and the UWB positioning signal transmitted by the reference positioning base station may include an identification field. For example, the identification field is Reference Base Station (i.e., R-BS), which may be set according to specific scenarios or protocols. In an example, the reference positioning base station serves as the reference point for a coverage area covered by the gate. That is, the preset range starting from the reference positioning base station indicates the gate area covered by the gate, and the gate area is a part of the passageway. It is also the area where the mobile terminal establishes a data connection with the UWB data base station in the subsequent embodiments. It should be understood that the size of the gate area can be set according to specific scenarios, such as being 30 cm*30 cm. It can be ensured that only one mobile terminal in the gate area can establish a data connection with the UWB data base station at one time. Alternatively, in other words, only one user is permitted to pass through the passageway at one time. When multiple gates are included, the gate area of each gate can be set in the above-mentioned way, which will not be repeated herein.

In practical applications, the number of times the user passes through the gate is limited. For example, it is generally 2-6 times during commuting. When the UWB receiving module remains normally turned on, its power consumption may shorten the standby time of the mobile terminal. Therefore, in an embodiment, the mobile terminal further includes a communication module in a preset target communication mode, and the communication module is used to turn on or turn off the UWB receiving module. It should be understood that the power consumption of the communication module will be much lower than the power consumption of the UWB receiving module when it is kept normally turned on. For example, the target communication mode includes at least one of the following: WiFi communication and Bluetooth communication. In the case that the function is reduced, the technician may select a suitable communication module according to the specific scenario, and the respective solution falls within the protection scope of the present disclosure.

In an embodiment, the UWB receiving module of the mobile terminal kept normally turned off and the aforementioned communication module kept normally turned on are taken as an example. The communication module of the mobile terminal may scan a broadcast signal in a preset communication mode periodically or in real time. It should be noted that, in order to match with the above-mentioned communication module, the adjacent area (which can be considered as a trigger area) of the disposing area (which can be considered as a positioning area) where the at least three UWB positioning base stations are located is also provided with a communication module for transmitting the above-mentioned broadcast signal, such as a Bluetooth module or a WiFi module. The broadcast signal may be used to enable the mobile terminal to determine that there are gates nearby and the UWB receiving module may be turned on. Taking the above-mentioned communication module being a Bluetooth module as an example, the above-mentioned broadcast signal may include a Universally Unique Identifier (UUID). When the mobile terminal detects the above-mentioned broadcast signal, the UWB receiving module in the mobile terminal can be turned on. It should be noted that the above-mentioned broadcast signal may also include other target fields for identification, and the respective solutions fall within the protection scope of the present disclosure.

Taking into account that different stations may be installed with different UWB positioning base stations, the configuration data of the UWB positioning base stations may also be different. In an embodiment, when the above-mentioned broadcast signal is detected, the step of turning on the UWB receiving module in the mobile terminal may include the following.

Figure 2:
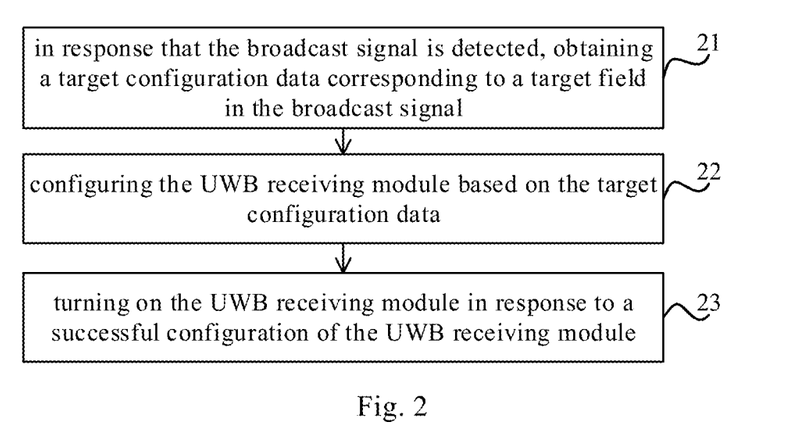
FIG. 2 is a flow chart for turning on the UWB receiving module according to an embodiment.

In an example, the corresponding relationship between the target field and the target configuration data is pre-stored in the mobile terminal. Referring to FIG. 2, in step 21, when the above-mentioned broadcast signal is detected, the mobile terminal can obtain a target configuration data corresponding to the target field in the broadcast signal. The target configuration data may include, but not limited to, frequency band, rate, front-end code, power, etc., which may be configured according to specific scenarios. In step 22, the mobile terminal may configure the UWB receiving module based on the above-mentioned target configuration data. In step 23, after the configuration is successful, the mobile terminal may turn on the UWB receiving module. If the configuration is unsuccessful, step 21 to step 23 may be performed until the configuration is successful. Alternatively, if the configuration is still unsuccessful for a certain number of times, a reminder message is generated. The technical solution in an example may be applied to a scenario where the communication module transmitting the above-mentioned broadcast signal is registered.

Figure 3:
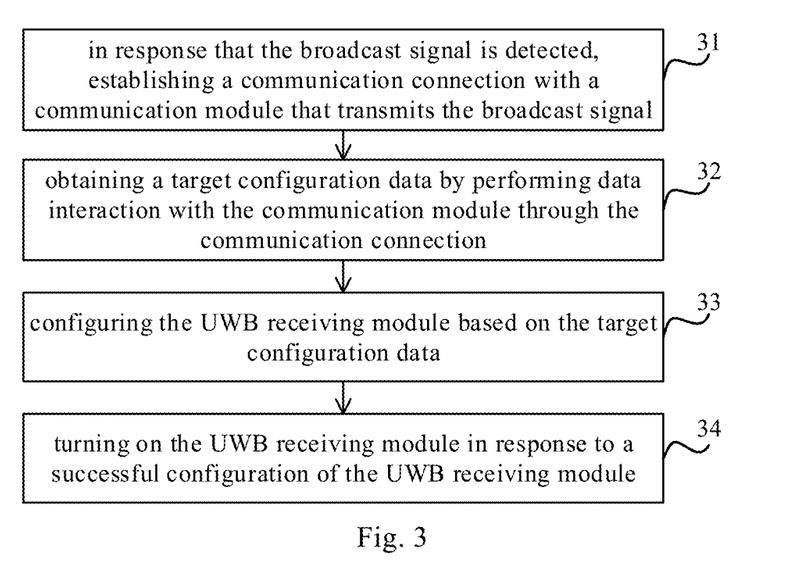
FIG. 3 is another flow chart for turning on the UWB receiving module according to an embodiment.

In another example, referring to FIG. 3, in step 31, when the above-mentioned broadcast signal is detected, the mobile terminal may establish a communication connection with the communication module that transmits the above-mentioned broadcast signal. Taking the communication module being a Bluetooth module as an example, the mobile terminal may generate a connection request after receiving the broadcast signal, and send the connection request to the communication module that transmits the broadcast signal. The communication module may accept the connection request and establish a communication connection between the two. In step 32, the mobile terminal performs data interaction with the communication module through the communication connection, so as to obtain the target configuration data. In step 33, the mobile terminal may configure the UWB receiving module based on the above-mentioned target configuration data. In step 34, after the configuration is successful, the mobile terminal may turn on the UWB receiving module. The technical solution in an example can be applied to a scenario where the communication module transmitting the above-mentioned broadcast signal is unregistered.

It should be understood that by configuring the UWB receiving module, the accurate communication of the UWB receiving module with the UWB positioning base station and the subsequent UWB data base station can be achieved, which is beneficial to improving the communication efficiency.

In step 12, the relative position of the mobile terminal with respect to the reference positioning base station is determined according to the UWB positioning signals.

In an embodiment, the relative position of the mobile terminal with respect to the reference positioning base station is determined according to three UWB positioning signals. The mobile terminal may determine the current position of the mobile terminal according to the UWB positioning signals. This may include positioning based on Time of Arrival (TOA), Time Difference of Arrival (TDOA), Angle of Arrival (AOA), and so on. Taking positioning based on Time Difference of Arrival (TDOA) as an example, the time difference between the UWB positioning signals transmitted by two UWB positioning base stations is used to obtain the distance difference of the mobile terminal with respect to the multiple sets of UWB positioning base stations, one set of which includes any two of the above-mentioned at least three UWB positioning base stations. Then, the mobile terminal may determine that the mobile terminal is located on a hyperbola with the two UWB positioning base stations being the focuses based on the above-mentioned distance difference. The distance calculation formula is as below:

$$[(x-xi)^2+(y-yi)^2]-[(x-xj)^2+(y-yj)^2]=\text{delta } dij^2,$$

where x, y represent the abscissa and ordinate of the mobile terminal; xi, yi represent the abscissa and ordinate of the first base station; and xj, yj represent the abscissa and ordinate of the second base station.

Since at least three UWB positioning base stations (whose positions being known) are included according to the present disclosure, multiple hyperbolic equations can be established, and the intersection of these hyperbolic directions indicates the two-dimensional coordinate position (i.e., the current position) of the mobile terminal.

In an embodiment, after the current position of the mobile terminal is determined, the relative position of the mobile terminal with respect to the reference base station can be determined according to the position of the reference positioning base station, where the relative position includes the distance and the offset angle. It should be noted that the calculation of the relative position with the determined current position of the mobile terminal and the known position of the reference positioning base station can be converted into mathematics to solve the distance between two points, and the offset angle between the mobile terminal and the reference positioning base station can be converted into mathematics to solve the angle between the connection line of two points and the reference coordinate axis. For the specific calculation process, the related technology can be referred to, which will not be repeated herein.

In this way, according to an embodiment, the mobile terminal can be automatically positioned without creating a map, which can reduce the amount of data for processing and improve the positioning accuracy.

In an embodiment, the mobile terminal may determine whether the above-mentioned relative position is located in the coverage area of one of the gates, including the following specifics.

In an example, the reference positioning base station acting as the reference point of the coverage area covered by each gate is introduced in step 11, and the relative position of the mobile terminal with respect to the reference positioning base station is further determined in step 12. At this time, the mobile terminal may determine the relationship between the above-mentioned relative position and the coverage area covered by each gate. That is, the mobile terminal may determine whether the above-mentioned relative position is within the coverage area of one of the gates.

In another example, the mobile terminal may also include a preset target map, the target map including the relative position of each gate with respect to the reference positioning base station. The mobile terminal may obtain the aforementioned preset target map, that is, the relative position corresponding to each gate. Then, the mobile terminal may calculate the distance between the relative position corresponding to the mobile terminal and the relative position corresponding to the gate. This can be converted into calculating the distance between two points. In addition, the mobile terminal may compare the aforementioned distance with a preset distance threshold (such as 30 cm, being adjustable). When the aforementioned distance is less than or equal to the preset distance threshold, the mobile terminal may determine that the relative position corresponding to the mobile terminal is in the coverage area of the gate.

In an embodiment, when it is determined that the above-mentioned relative position is located in the coverage area of one of the gates, the mobile terminal may establish a data connection with the UWB data base station, and perform data interaction through the above-mentioned data connection.

Taking the entrance of a station as an example, a mobile terminal may exchange an identity credential, such as certification, key, etc., with a UWB data base station for identity authentication. The above-mentioned identity credential may be obtained when the application is installed or may be preset when the mobile terminal leaves the factory. In the data interaction process, the aforementioned UWB data base station serves as an intermediate device, which may forward the data from the mobile terminal to the background server, and forward the data provided by the background server to the mobile terminal. The background server may determine that the mobile terminal enters the station based on the identity credential, and make an entry mark. After a successful interaction, the background server may control the gate to open, and the user may enter the station through the passageway. It should be noted that the above content merely exemplarily describes the process of data interaction when entering the station. The above data interaction process may be set according to the working principle of the pass card, NFC or QR code payment for the station, and the respective implementations fall into the protection scope of the present disclosure.

Taking the exit of a station as an example, a mobile terminal may exchange an identity credential, such as certification and key, with a UWB data base station for identity authentication. The background server may determine when and where the mobile terminal enters the station and where to leave the station based on the identity credential, thus determining the payment fee and completing the payment based on the enter and exit information. After the payment is completed, payment reminder information output by the background server may be received. The payment reminder information may include, but not limited to, information such as enter time and location, exit time and location, and expenses. After a successful payment, the background server may control the gate to open, and the user may exit the station through the passageway. It should be noted that the above content merely exemplarily describes the process of data interaction when leaving the station, that is, the payment process. The above data interaction process can be set according to the payment principle of the pass card, NFC or QR code for the station, and the respective implementations are falling within the protection scope of the present disclosure.

In this way, according to an embodiment, the mobile terminal can automatically located, establish a data connection, and complete data interaction, thus achieving the effect of passing through the gate without any user operation, which is beneficial to improve the efficiency of passing through the gate.

In order to avoid shortening the standby time of the mobile terminal when the UWB receiving module remains normally turned on, in an embodiment, after the data interaction is completed, the communication module in the mobile terminal may continue to scan the broadcast signal in a preset target communication mode. When it is detected that the broadcast signal disappears from the scanning list, the UWB receiving module in the mobile terminal is turned off, which helps to reduce the power consumption of the mobile terminal.

Based on the data interaction method provided by the foregoing embodiment, an embodiment of the present disclosure further provides a data interaction system. The data interaction system includes at least three UWB positioning base stations and a mobile terminal. One of the at least three UWB positioning base stations is a reference positioning Base station. Each UWB positioning base station is configured to transmit a UWB positioning signal according to a preset period. The mobile terminal is configured to obtain UWB positioning signals transmitted by the at least three UWB positioning base stations, and determine the relative position of the mobile terminal with respect to the reference positioning base station according to the UWB positioning signals.

In an embodiment, the reference positioning base station is configured as a reference point for the coverage area covered by a gate. The system further includes a UWB data base station, a background server and multiple gates. The mobile terminal is further configured to determine that the relative position is located in the coverage area of a gate, and then establish a data connection with the UWB data base station, and complete data interaction with the background server through the data connection. The background server is configured to control the gate to open after the data interaction is completed.

In an embodiment, the system further includes a communication module in a target communication mode. The communication module is configured to broadcast a broadcase signal according to a preset target communication mode. The mobile terminal is further configured to scan the broadcast signal in the preset target communication mode. When the above-mentioned broadcast signal is detected, the UWB receiving module in the mobile terminal is turned on. The target communication mode includes at least one of the following: WiFi communication, and Bluetooth communication.

Figure 4:
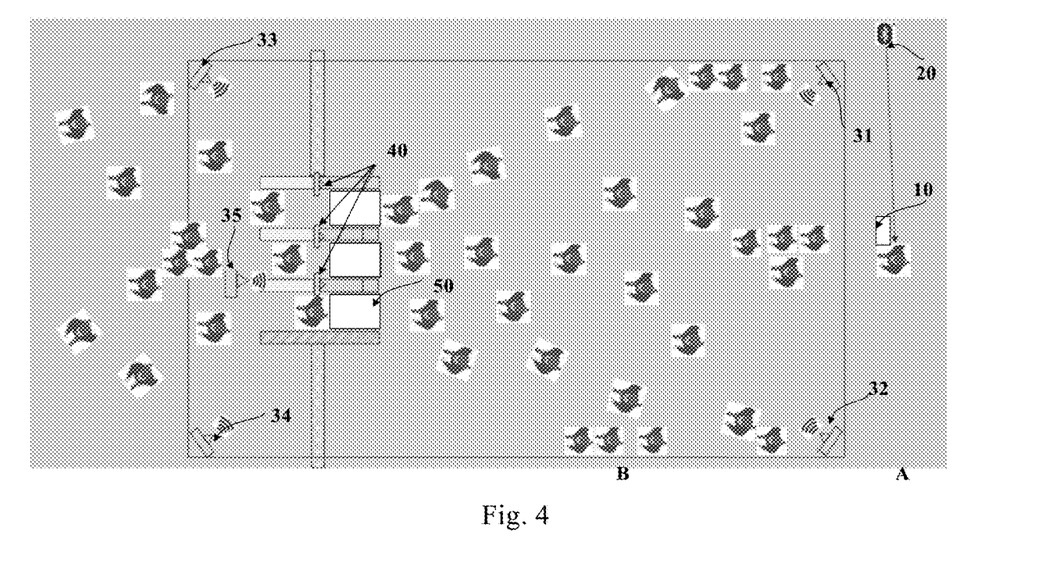
FIG. 4 is a schematic diagram showing an application scenario of a data interaction system according to an embodiment.

The following describes the working process of the above-mentioned data interaction system by referring to the scenario having the communication module being the Bluetooth module, 4 UWB positioning base stations and 1 reference positioning base station, in connection with the scenario where the user passes through the gate in FIG. 4.

When the user enters area A of the station, the Bluetooth module of the smart phone 10 scans the broadcast signal of the Bluetooth module 20. The smart phone 10 obtains the target configuration parameter corresponding to the broadcast signal and configures its own UWB receiving module. Then, the UWB receiving module is turned on. In this way, the UWB receiving module is turned on only when data interaction is needed, which helps to save the power consumption of the smart phone.

When the user enters the B area of the station, the UWB receiving module in the smart phone 10 receives the UWB positioning signal transmitted by each of the UWB positioning base stations 31 to 35, and may calculate the current position of the smart phone 10, and the relative position with respect to the reference positioning base station 35. Because the reference positioning base station 35 contains an identification field, the mobile terminal may determine the relative position by using the reference positioning base station 35 as a reference. In other words, compared with related technologies, the relative position may be obtained without creating a map in an example. UWB positioning base stations 31 to 35 need to be in strictly clock synchronization.

When the smart phone 10 determines that it is close to the gate, the smart phone 10 performs data interaction with the UWB data base station 40, such as exchanging the payment credential. The smart phone and the UWB data base station should be installed with the identity credential (such as certification, key, etc.) in advance for identity authentication. For example, the identity credential may be installed when the application is installed, or the mobile phone may be preset with the identity credential when it leaves the factory.

The process for the smart phone 10 to determine that it is close to the gate is as follows.

In the vicinity of the gate, a reference positioning base station 35 is disposed. The identification field is added into the broadcast so that the smart phone 10 can recognize the difference between the reference positioning base station and any other base station. After the relative position of the smart phone with respect to the reference positioning base station 35 is determined, it can be determined whether the smart phone is in the coverage area of the gate according to the relative position. As an example, as shown in FIG. 4, when the smart phone is located in the area 50 relative to the reference positioning base station 35, it can be determined that the smart phone is in the coverage area of the gate. Otherwise, it can be determined that the smart phone is not in the coverage area of the gate. The relative position of the smart phone with respect to the reference positioning base station 35 may be represented by, for example, the distance and offset angle of the smart phone relative to the reference positioning base station 35.

After the data interaction is completed, the gate can be controlled to open, allowing the user to enter or exit the station.

Figure 5:
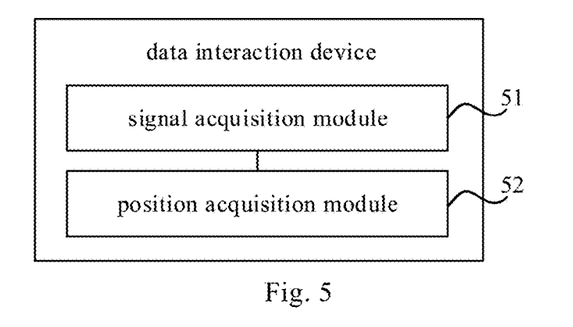
FIG. 5 is a block diagram showing a data interaction device according to an embodiment.

Based on the data interaction method provided by the foregoing embodiment, an embodiment of the present disclosure further provides a data interaction device, which is applied to a mobile terminal. Referring to FIG. 5, the device includes: a signal acquisition module 51, configured to acquire UWB positioning signals transmitted by at least three UWB positioning base stations where one of the at least three UWB positioning base stations is a reference positioning base station; and a position acquisition module 52, configured to determine the relative position of the mobile terminal with respect to the reference positioning base station according to the UWB positioning signals.

In an embodiment, the reference positioning base station serves as a reference point for the coverage area covered by a gate among multiple gates, and the device further includes: an area determination module, configured to determine whether the mobile terminal is located in the coverage area of the gate according to the relative position, and to send a trigger signal to a data interaction module when the relative position indicates that the mobile terminal is located in the coverage area of the gate; and the data interaction module, configured to establish a data connection with the UWB data base station when receiving the trigger signal and to perform data interaction through the data connection, such that the gate is controlled to open.

In an embodiment, the device further includes: a signal scanning module, configured to scan the broadcast signal in the preset target communication mode, where the target communication mode includes at least one of the following: WiFi communication and Bluetooth communication; and a module turning-on module, configured to turn on the UWB receiving module in the mobile terminal when the broadcast signal is detected.

In an embodiment, the module turning-on module includes: a data acquiring unit, configured to acquire target configuration data corresponding to a target field in the broadcast signal when the broadcast signal is detected; a module configuration unit, configured to configure the UWB receiving module based on the target configuration data; and a module turning-on unit, configured to turn on the UWB receiving module after the configuration is successful.

In an embodiment, the module turning-on module includes: a connection establishment module, configured to establish a communication connection with the communication module that transmits the broadcast signal when the broadcast signal is detected; a data acquisition module, configured to perform data interaction with the communication module through the communication connection to obtain target configuration data; a module configuration module, configured to configure the UWB receiving module based on the target configuration data; and a module turning-on unit, configured to turn on the UWB receiving module after the configuration is successful.

In an embodiment, the UWB receiving module in the mobile terminal is turned on, and the device further includes: a signal scanning module, configured to scan the broadcast signal in the preset target communication mode, where the target communication mode includes at least one of the following: WiFi communication and Bluetooth communication; and a module turning-off module, configured to turn off the UWB receiving module in the mobile terminal when it is detected that the broadcast signal disappears from the scanning list.

It should be noted that the device shown in the above embodiment matches with the method embodiments shown in FIG. 1 to FIG. 3, the content of the foregoing method embodiment may be referred to, and details are not described herein again.

An embodiment of the present disclosure further provides a UWB positioning base station, and the base station includes: a signal transmitting module, configured to transmit a UWB positioning signal including an identification field, such that the mobile terminal determines the UWB positioning base station as a preset reference positioning base station according to the identification field.

Figure 6:
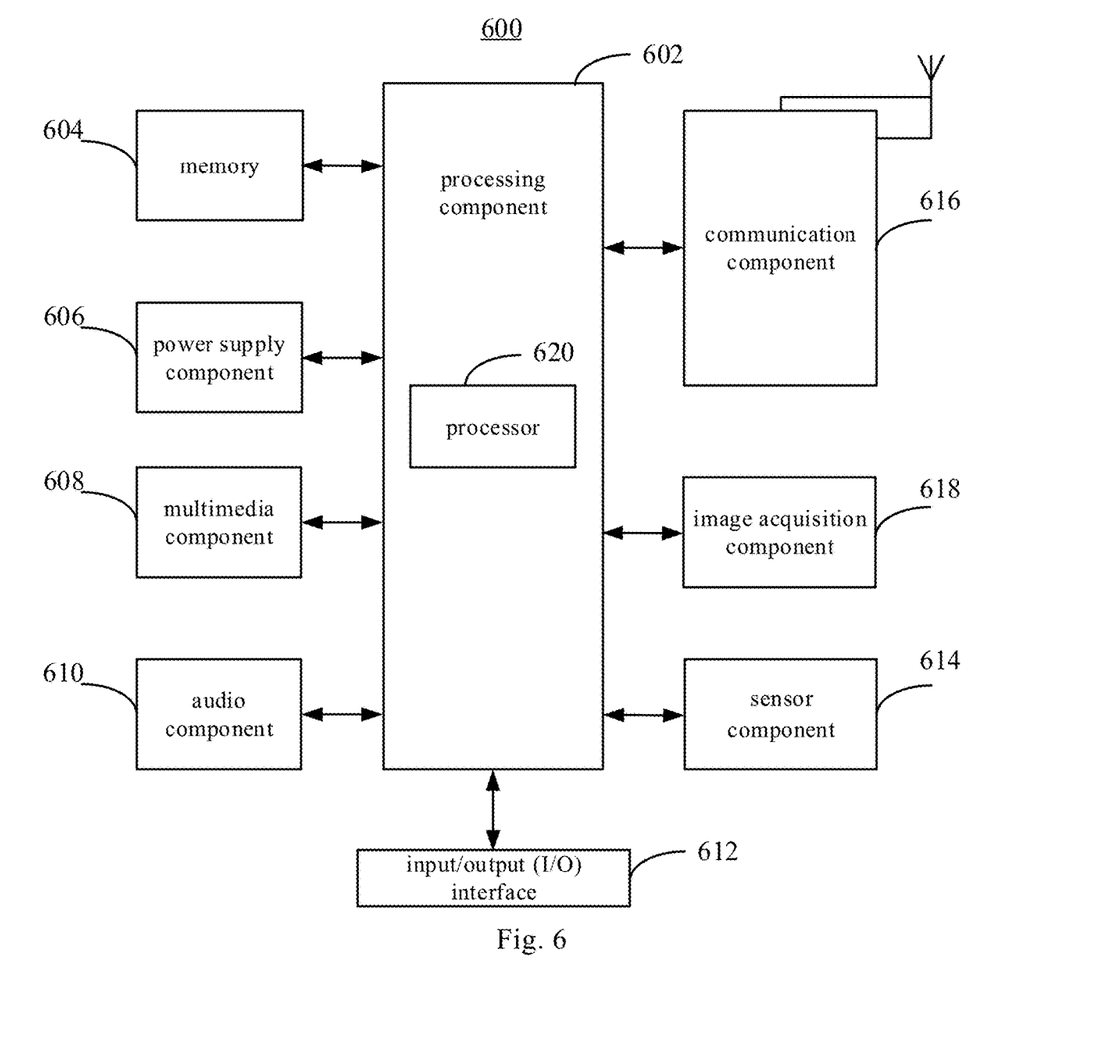
FIG. 6 is a block diagram showing a mobile terminal according to an embodiment.

FIG. 6 is a block diagram showing a mobile terminal according to an embodiment. For example, the mobile terminal 600 may be a smart phone, a computer, a digital broadcasting terminal, a tablet device, a medical device, a fitness device, a personal digital assistant, etc.

With reference to FIG. 6, the mobile terminal 600 may include one or more of the following components: a processing component 602, a memory 604, a power supply component 606, a multimedia component 608, an audio component 610, an input/output (I/O) interface 612, a sensor component 614, a communication component 616, an image acquisition component 618, and the above-mentioned housing.

The processing component 602 generally controls the overall operations of the mobile terminal 600, such as operations associated with display, phone call, data communication, camera operation, and recording operation. The processing component 602 may include one or more processors 620 to execute computer programs. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support operations in the mobile terminal 600. Examples of these data include computer programs for any application or method running on the mobile terminal 600, contact data, phone book data, messages, pictures, videos, etc. The memory 604 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 606 provides power for various components of the mobile terminal 600. The power supply component 606 may include a power management system, one or more power supplies, and other components associated with the generation, management, and distribution of power for the mobile terminal 600. The power supply component 606 may include a power supply chip, and the controller may communicate with the power supply chip, thus controlling the power supply chip to turn on or off the switching device, so that power is supplied to the main board circuit or no power is supplied.

The multimedia component 608 includes a screen that provides an output interface between the mobile terminal 600 and the target object. In some embodiments, the screen may include a liquid crystal display (LCD) and a touch panel (TP). If the screen includes a touch panel, the screen may be implemented as a touch screen to receive input information from the target object. The touch panel includes one or more touch sensors to sense touch, sliding, and gesture on the touch panel. The touch sensor can not only sense the boundary of the touch or sliding action, but also detect the duration and pressure related to the touch or sliding operation.

The audio component 610 is configured to output and/or input audio file information. For example, the audio component 610 includes a microphone (MIC). When the mobile terminal 600 is in an operation mode, such as a call mode, a recording mode, and a voice recognition mode, the microphone is configured to receive external audio file information. The received audio file information may be further stored in the memory 604 or sent via the communication component 616. In some embodiments, the audio component 610 further includes a speaker for outputting audio file information.

The I/O interface 612 provides an interface between the processing component 602 and a peripheral interface module. The above-mentioned peripheral interface module may be a keyboard, a click wheel, a button, and the like.

The sensor component 614 includes one or more sensors for providing the mobile terminal 600 with various aspects of state evaluation. For example, the sensor component 614 may detect the turning-on/turning-off state of the mobile terminal 600 and the relative positioning among the components, such as the display screen and the keypad of the mobile terminal 600. The sensor component 614 may further detect the position change of the mobile terminal 600 or a component, the presence or absence of contact between the target object and the mobile terminal 600, change in the orientation or acceleration/deceleration of the mobile terminal 600, and the temperature change of the mobile terminal 600. In an example, the sensor component 614 may include a magnetic sensor, a gyroscope, and a magnetic field sensor, where the magnetic field sensor includes at least one of the following: a Hall sensor, a thin film magnetoresistive sensor, and a magnetic liquid acceleration sensor.

The communication component 616 is configured to facilitate the wired or wireless communication between the mobile terminal 600 and other devices. The mobile terminal 600 may access a wireless network based on a communication standard, such as WiFi, 2G, 3G, 4G, 5G, or a combination thereof. In an embodiment, the communication component 616 receives broadcast information or broadcast-related information from an external broadcast management system via a broadcast channel. In an embodiment, the communication component 616 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an embodiment, the mobile terminal 600 may be implemented by one or more application specific integrated circuits (ASIC), digital information processors (DSP), digital information processing devices (DSPD), programmable logic devices (PLD), field Program gate arrays (FPGA), controllers, microcontrollers, microprocessors, or other electronic components.

In an embodiment, there is also provided a non-transitory readable storage medium containing an executable computer program, such as a memory 604 containing instructions, where the foregoing executable computer program may be executed by a processor. The readable storage medium may be ROM, random access memory (RAM), CD-ROM, magnetic tape, floppy disk, optical data storage device, etc.

According to another aspect of embodiments of the present disclosure, there is provided a data interaction device applied to a mobile terminal. The device includes: a signal acquisition module, configured to acquire UWB positioning signals transmitted by at least three UWB positioning base stations, where one of the at least three UWB positioning base stations is a reference positioning base station; and a position acquisition module, configured to determine the relative position of the mobile terminal with respect to the reference positioning base station according to the UWB positioning signals.

In some embodiments, the reference positioning base station is configured as a reference point for a coverage area covered by a gate among a plurality of gates, and the device further includes: an area determination module and a data interaction module. The area determination module is configured to determine whether the mobile terminal is located in the coverage area of the gate according to the relative position, and to send a trigger signal to the data interaction module in response to the relative position indicating that the mobile terminal is located in the coverage area of the gate. The data interaction module is configured to establish a data connection with the UWB data base station when receiving the trigger signal and to perform data interaction through the data connection, such that the gate is controlled to open.

In some embodiments, the device further includes: a signal scanning module, configured to scan a broadcast signal in a preset target communication mode, where the target communication mode includes at least one of WiFi communication and Bluetooth communication; and a module turning-on module, configured to turn on the UWB receiving module in the mobile terminal when the broadcast signal is detected.

In some embodiments, the module turning-on module includes: a data acquiring unit, configured to acquire a target configuration data corresponding to a target field in the broadcast signal when the broadcast signal is detected; a module configuration unit, configured to configure the UWB receiving module based on the target configuration data; and a module turning-on unit, configured to turn on the UWB receiving module after the configuration of the UWB receiving module is successful.

In some embodiments, the module turning-on module includes: a connection establishment unit, configured to establish a communication connection with the communication module that transmits the broadcast signal when the broadcast signal is detected; a data acquisition unit, configured to perform data interaction with the communication module through the communication connection to obtain a target configuration data; a module configuration unit, configured to configure the UWB receiving module based on the target configuration data; and a module turning-on unit, configured to turn on the UWB receiving module after the configuration of the UWB receiving module is successful.

In some embodiments, the UWB receiving module in the mobile terminal is turned on, and the device further includes: a signal scanning module, configured to scan a broadcast signals in a preset target communication mode, where the target communication mode includes at least one of WiFi communication and Bluetooth communication; and a module turning-off module, configured to turn off the UWB receiving module in the mobile terminal when it is detected that the broadcast signal disappears from the scanning list.

The technical solutions provided by embodiments of the present disclosure may include the following beneficial effects.

It can be seen from the above-mentioned embodiments that in the technical solutions provided by embodiments of the present disclosure, the mobile terminal can obtain UWB positioning signals transmitted by at least three UWB positioning base stations, where one of the at least three UWB positioning base stations is the reference positioning base station. According to the UWB positioning signals, the relative position of the mobile terminal with respect to the reference positioning base station can be determined. In this way, according to an embodiment, the mobile terminal can be automatically positioned without creating a map, which can reduce the amount of data for processing and improve the positioning accuracy. The application to a gate is taken as an example. According to an embodiment, the mobile terminal can be automatically located, establish a data connection, and perform data interaction, so as to achieve the effect of passing the gate without any user operation, which is beneficial to improve the efficiency in passing the gate.

In some embodiments, the reference positioning base station is configured as a reference point for a coverage area covered by a gate among a plurality of gates, and the method further includes: determining whether the mobile terminal is located in the coverage area of the gate according to the relative position; and if the mobile terminal is located in the coverage area of the gate, establishing a data connection with a UWB data base station and performing data interaction through the data connection, such that the gate is controlled to open.

In some embodiments, before acquiring the UWB positioning signals, the method further includes: scanning a broadcast signal in a preset target communication mode, where the target communication mode includes at least one of WiFi communication and Bluetooth communication; and in response that the broadcast signal is detected, turning on a UWB receiving module in the mobile terminal.

In some embodiments, the turning on the UWB receiving module in the mobile terminal in response that the broadcast signal is detected, includes: in response that the broadcast signal is detected, acquiring a target configuration data corresponding to a target field in the broadcast signal; configuring the UWB receiving module based on the target configuration data; and turning on the UWB receiving module in response to a successful configuration of the UWB receiving module.

In some embodiments, the turning on the UWB receiving module in the mobile terminal in response that the broadcast signal is detected, includes: in response that the broadcast signal is detected, establishing a communication connection with the communication module that transmits the broadcast signal; obtaining a target configuration data by performing data interaction with the communication module through the communication connection; configuring the UWB receiving module based on the target configuration data; and turning on the UWB receiving module in response to a successful configuration of the UWB receiving module.

In some embodiments, in a case the UWB receiving module in the mobile terminal is turned on, the method further includes: scanning a broadcast signal in a preset target communication mode, where the target communication mode includes at least one of WiFi communication and Bluetooth communication; and in response to detecting that the broadcast signal disappears from the scanning list, turning off the UWB receiving module in the mobile terminal.

In some embodiments, the system further includes a UWB data base station, a background server, and a plurality of gates. The mobile terminal is further configured to: establish a data connection with the UWB data base station in response to the relative position indicating that the mobile terminal is located in the coverage area of a gate among the plurality of gates; and to perform data interaction with the background server through the data connection. The background server is configured to control the gate to open after the data interaction is completed.

In some embodiments, the system further includes a communication module in a target communication mode, where the communication module is configured to broadcast a broadcast signal according to a preset target communication mode. The mobile terminal is further configured to scan the broadcast signal in the preset target communication mode, and to turn on the UWB receiving module in the mobile terminal when the broadcast signal is detected.

In some embodiments, the target communication mode includes at least one of WiFi communication and Bluetooth communication.

After considering the present specification and practicing the present disclosure disclosed herein, those skilled in the art will easily think of other embodiments of the present disclosure. The present disclosure is intended to cover any variations, uses, or adaptive changes that follow the general principle of the present disclosure and include common knowledge or conventional technical means in the technical field that are not disclosed in the present disclosure. The description and embodiments are to be regarded as exemplary only, and the true scope and spirit of the present disclosure are restricted by the following claims.

It should be understood that the present disclosure is not limited to the precise structure that has been described above and shown in the drawings, and various modifications and changes can be made without departing from the scope of the present disclosure. The scope of the present disclosure is only limited by the appended claims.

What is claimed is:

1. A data interaction method, the method being applied to a mobile terminal and comprising:

acquiring Ultra-WideBand (UWB) positioning signals transmitted by at least three UWB positioning base stations, wherein one of the at least three UWB positioning base stations is a reference positioning base station; and determining a relative position of the mobile terminal with respect to the reference positioning base station according to the UWB positioning signals, wherein the reference positioning base station is configured as a reference point for a coverage area covered by a gate among a plurality of gates, and the method further comprises:

determining whether the mobile terminal is located in the coverage area of the gate according to the relative position, and in response that the mobile terminal is located in the coverage area of the gate, establishing a data connection with a UWB data base station and performing data interaction through the data connection, such that the gate is controlled to open; and the method further comprises:

scanning a broadcast signal in a preset target communication mode, wherein the target communication mode comprises at least one of WiFi communication and Bluetooth communication, and turning on a UWB receiver in the mobile terminal in response that the broadcast signal is detected.

2. The method according to claim 1, wherein turning on the UWB receiver in the mobile terminal in response that the broadcast signal is detected comprises:

in response that the broadcast signal is detected, obtaining a target configuration data corresponding to a target field in the broadcast signal;

configuring the UWB receiver based on the target configuration data; and turning on the UWB receiver in response to a successful configuration of the UWB receiver.

3. The method according to claim 1, wherein turning on the UWB receiver in the mobile terminal in response that the broadcast signal is detected comprises:

in response that the broadcast signal is detected, establishing a communication connection with a communication module that transmits the broadcast signal;

obtaining a target configuration data by performing data interaction with the communication module through the communication connection;

configuring the UWB receiver based on the target configuration data; and turning on the UWB receiver in response to a successful configuration of the UWB receiver.

4. The method according to claim 1, further comprising: in response that a UWB receiver in the mobile terminal is turned on, scanning a broadcast signal in a preset target communication mode, wherein the target communication mode comprises at least one of WiFi communication and Bluetooth communication; and in response to detecting that the broadcast signal disappears from a scanning list, turning off the UWB receiver in the mobile terminal.

5. A mobile terminal, comprising:

a processor; and a memory, configured to store a computer program executable by the processor, wherein the processor is configured to execute the computer program in the memory to implement the method according to claim 1.

6. The mobile terminal according to claim 5, wherein turning on the UWB receiver in the mobile terminal in response that the broadcast signal is detected comprises:

in response that the broadcast signal is detected, obtaining a target configuration data corresponding to a target field in the broadcast signal;

configuring the UWB receiver based on the target configuration data; and turning on the UWB receiver in response to a successful configuration of the UWB receiver.

7. The mobile terminal according to claim 5, wherein turning on the UWB receiver in the mobile terminal in response that the broadcast signal is detected comprises:

in response that the broadcast signal is detected, establishing a communication connection with a communication module that transmits the broadcast signal;

obtaining a target configuration data by performing data interaction with the communication module through the communication connection;

configuring the UWB receiver based on the target configuration data; and turning on the UWB receiver in response to a successful configuration of the UWB receiver.

8. The mobile terminal according to claim 5, wherein the method further comprises: in response that a UWB receiver in the mobile terminal is turned on, scanning a broadcast signal in a preset target communication mode, wherein the target communication mode comprises at least one of WiFi communication and Bluetooth communication; and in response to detecting that the broadcast signal disappears from a scanning list, turning off the UWB receiver in the mobile terminal.

9. A data interaction system, comprising: at least three Ultra-WideBand (UWB) positioning base stations and a mobile terminal, wherein one of the at least three UWB positioning base stations is a reference positioning base station;

each of the UWB positioning base stations is configured to transmit a UWB positioning signal according to a preset period; and the mobile terminal is configured to obtain the UWB positioning signals transmitted by the at least three UWB positioning base stations, and to determine a relative position of the mobile terminal with respect to the reference positioning base station according to the UWB positioning signals, wherein the data interaction system further comprises: a UWB data base station, a background server, and a plurality of gates, wherein the reference positioning base station is configured as a reference point for a coverage area covered by a gate among the plurality of gates;

the mobile terminal is further configured to: determine whether the mobile terminal is located in the coverage area of the gate according to the relative position; and in response to the mobile terminal being located in the coverage area of the gate, establish a data connection with a UWB data base station and perform data interaction with the background server through the data connection; and the background server is configured to control the gate to open after the data interaction is completed, wherein the data interaction system further comprises a communication module in a target communication mode, wherein the communication module is configured to transmit a broadcast signal according to a preset target communication mode; and the mobile terminal is further configured to scan the broadcast signal in the preset target communication mode, and to turn on a UWB receiver in the mobile terminal in response that the broadcast signal is detected, wherein the target communication mode comprises at least one of WiFi communication and Bluetooth communication.

* * * * *